(12) United States Patent
Groth et al.

(10) Patent No.: US 6,893,010 B2
(45) Date of Patent: May 17, 2005

(54) SLEEVE, PARTICULARLY A ROD SLEEVE

(75) Inventors: Michael Groth, Hamburg (DE);
Rüdiger Meyer, Amelinghausen (DE)

(73) Assignee: Phoenix AG, Hamburg (DE)

(*) Notice: Subject to any disclaimer, the term of this patent is extended or adjusted under 35 U.S.C. 154(b) by 0 days.

(21) Appl. No.: 10/312,380

(22) PCT Filed: Apr. 12, 2002

(86) PCT No.: PCT/DE02/01371
§ 371 (c)(1),
(2), (4) Date: Dec. 23, 2002

(87) PCT Pub. No.: WO02/088567
PCT Pub. Date: Nov. 7, 2002

(65) Prior Publication Data
US 2003/0090045 A1 May 15, 2003

(30) Foreign Application Priority Data
Apr. 26, 2001 (DE) ......................................... 101 20 557

(51) Int. Cl.⁷ ............................................... F16F 13/14
(52) U.S. Cl. .................. 267/141.2; 267/141.1; 280/124.14 S
(58) Field of Search .................... 267/153, 141.2–141.7

(56) References Cited

U.S. PATENT DOCUMENTS

| | | | | |
|---|---|---|---|---|
| 2,781,990 A | * | 2/1957 | Via ........................... | 267/141.7 |
| 5,938,220 A | * | 8/1999 | Torneld ................. | 280/124.145 |
| 6,007,058 A | | 12/1999 | Kokubo et al. | |
| 6,065,742 A | * | 5/2000 | Whiteford ................. | 267/140.5 |
| 6,164,405 A | * | 12/2000 | Sakata .......................... | 180/400 |
| 6,666,438 B2 | * | 12/2003 | Nakagawa ............... | 267/141.2 |

FOREIGN PATENT DOCUMENTS

| | | |
|---|---|---|
| DE | 30 04 194 | 8/1981 |
| DE | 40 33 805 | 4/1992 |
| DE | 42 08 448 | 4/1993 |
| DE | 199 13 079 | 9/2000 |
| DE | 199 13 777 | 1/2001 |
| EP | 0 995 928 | 4/2000 |
| EP | 132 642 | 9/2001 |
| GB | 2 033 533 | 5/1980 |

* cited by examiner

Primary Examiner—Matthew C. Graham
(74) Attorney, Agent, or Firm—Collard & Roe, P.C.

(57) ABSTRACT

A sleeve (1), particularly a rod sleeve, at least consisting of a core comprising a core hub (2) that has two faces (3), and comprising a core pin (4), which extends in the direction of longitudinal axis Y and which projects over both faces of the core hub while forming two connecting journals (5). The inventive sleeve also consists of an outer sleeve (6) and of an elastic layer (7) located between the core hub (2) and the outer sleeve (6). The core hub (2) and the core pin (4) form a one-piece core system that is provided, however, in two parts with regard to the normal X to the longitudinal axis Y, whereby both core halves (A1, A2) are assembled with interference fit by means of an insertion-slot system (8). The core hub (2) between its two faces (3) undergoes a tapering with an angle changeα, whereby the respective contact surfaces (9, 10) of the core hub and of the outer sleeve (6) extend in a manner that essentially corresponds to the elastic layer (7). The outer sleeve (6) and the elastic layer (7) are provided in two parts with regard to the normal X to the longitudinal Y. Both sleeve halves (B1, B2) are assembled with interference fit by means of an insertion-slot system (11), whereas both elastic layer halves (C1, C2) are placed at a distance L1 from one another.

15 Claims, 3 Drawing Sheets

SLEEVE, PARTICULARLY A ROD SLEEVE

CROSS REFERENCE TO RELATED APPLICATIONS

Applicants claim priority under 35 U.S.C. §119 of GERMANY Application No. 101 20 557.0 filed on 26 Apr. 2001. Applicants also claim priority under 35 U.S.C. §365 of PCT/DE02/01371 filed on 12 Apr. 2002. The international application under PCT article 21(2) was not published in English.

BACKGROUND OF THE INVENTION

1. Field of the Invention

The invention relates to a sleeve, particularly a rod sleeve, consisting at least of:

- a core made of metal or plastic (e.g. on the basis of polyphenylene ether), comprising a core hub that has two faces with a first and a second diameter, and a core pin which extends in the direction of the longitudinal axis, which projects over both faces of the core hub while forming two connecting journals;
- an outer sleeve that also consists of metal or plastic; as well as
- an elastic layer that is arranged between the core hub and the outer sleeve.

2. Prior Art

Sleeves of this type, whereby reference is particularly made to the references DE 30 04 194 A1, DE 42 08 448 C2, and DE 199 13 777 C1, are predominantly used in rail vehicle technology, which will be explained in greater detail in the following.

A significant aspect is the guidance of the wheel set of a rail vehicle by means of an elastic, play-free joint, linearly in the three directions of space, and torsionally, i.e. cardanically around the point of rotation of a guide arm, which is attached to the frame of the rail vehicle by means of a guide element (rod sleeve). In this connection, the longitudinal axis and height axis of the vehicle lie in the radial direction of the guide element, while the crosswise axis of the vehicle lies in the axial direction of the guide element.

With the background of this technology, the following requirements must be met:

a) One significant requirement is great rigidity in the radial and the axial direction. The required ratio of radial to axial rigidity is approximately 1:1 to 3:1. At the same time, a low torsion rigidity with simultaneous great cardanic rigidity is desirable. The ratio of cardanic rigidity to torsion rigidity should usually be approximately 10:1.

In the case of a conventional cylindrical elastomer sleeve, however, the ratio of radial to axial rigidity is too great, at approximately 5:1 to 10:1.

In the case of a spherical elastomer ball joint, the ratio of cardanic to torsion rigidity is too low, at approximately 3:1 to 5:1.

The aforementioned requirements can therefore not be met simultaneously by either one of the two conventional design principles.

b) Another requirement is that if needed, a mechanical fixed stop that acts in the radial direction can be integrated into the component.

This requirement, again, cannot be met by either one of the two construction designs mentioned under (a), by itself.

SUMMARY OF THE INVENTION

The task of the invention now is to make available a sleeve, particularly a rod sleeve, that meets the entire complex of requirements (a, b).

This task is accomplished, according to an embodiment of the invention, in that

- the core hub and the core pin form a one-piece core system that is provided, however, in two parts with regard to the normal to the longitudinal axis, whereby both core halves are assembled with interference fit by means of an insertion-slot system;
- the core hub, between its two faces, undergoes a tapering with an angle change, specifically forming a third diameter, whereby the respective contact surfaces of the core hub and of the outer sleeve extend in a manner that essentially corresponds to the elastic layer; as well as
- the outer sleeve and the elastic layer are provided in two parts with regard to the normal to the longitudinal axis, whereby both sleeve halves are assembled with interference fit by means of an insertion-slot system, whereas both elastic layer halves are placed at a distance from one another.

According to another embodiment the core hub and the core pin are separate components, whereby the core hub is provided in two parts with regard to the normal to the longitudinal axis, whereas the core pin extends continuously and undivided, whereby both hub halves form an interference fit with the core pin within the common hub-pin contact zone.

Other practical embodiments of the invention are also disclosed.

BRIEF DESCRIPTION OF THE DRAWINGS

The invention will now be explained on the basis of exemplary embodiments, making reference to schematic drawings. These show.

DETAILED DESCRIPTION OF THE INVENTION

Figure 1:
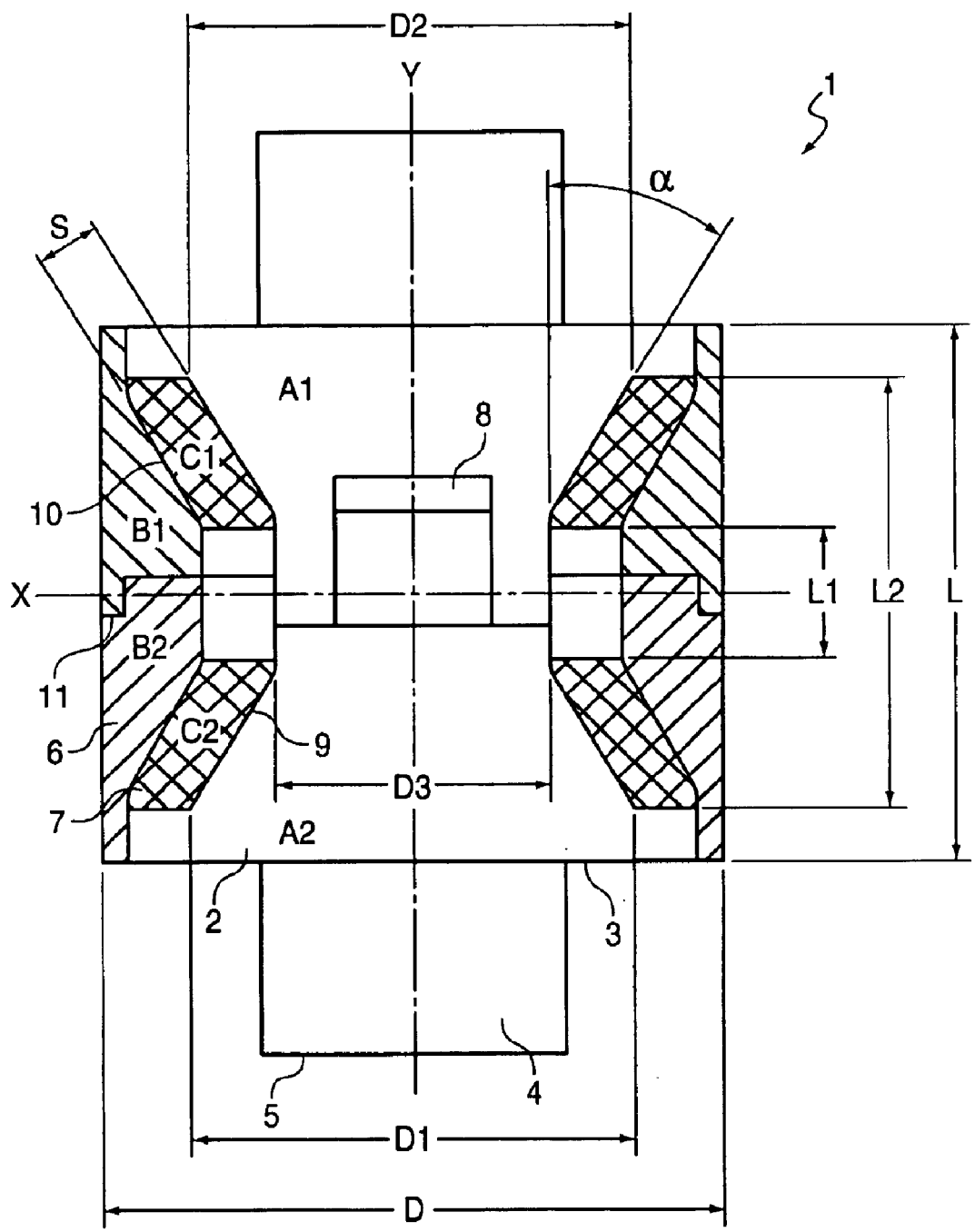
FIG. 1 a sleeve in which the core hub and the core pin form a one-piece core system.

FIG. 1 shows a sleeve 1, comprising a core hub 2, which has two faces 3 with a first and a second diameter D1 and D2, respectively, and a core pin 4 which extends in the direction of the longitudinal axis Y, which pin projects over the two faces of the core hub, forming two connecting journals 5. The core hub and the core pin have cross-sectional areas that are essentially circular.

The core hub 2 and the core pin 4 form a one-piece core system that is provided, however, in two parts with reference to the normal X to the longitudinal axis Y, whereby both core halves A1 and A2 are assembled with interference fit by means of an insertion-slot system 8.

The core hub 2, between its two faces 3, undergoes a tapering with an angle change a, specifically forming a third diameter D3, whereby the respective contact surfaces 9 and 10 of the core hub and of the outer sleeve 6 extend in a manner that essentially corresponds to the elastic layer 7.

The outer sleeve 6 with the total length L and the outside diameter D, as well as the elastic layer 7 with the total length L2 are provided in two parts with regard to the normal X to the longitudinal axis Y, whereby both sleeve halves B1 and B2 are assembled with interference fit by means of an insertion-slot system 11, whereas both elastic layer halves C1 and C2 are placed at a distance L1 from one another.

The elastic layer 7 is structured to be circumferential, in most cases, if necessary in combination with kidneys (DE 199 31 079 A1, FIG. 4a). However, an elastic layer that is provided with separating chamber can also be used (DE 42 08 448 C1, FIG. 2). The elastic layer consists of an elastic material, particularly on the basis of natural rubber (NR), or a thermoplastic elastomer (TPE). A structure as a layer spring is also possible (DE 199 13 777 C1). The thickness S of the elastic layer 7, which is essentially constant, is 2 mm to 30 mm, preferably 10 mm to 20 mm, specifically with reference to the unstressed state. The distance L1 between both elastic layer halves C1 and C2 comprises approximately the entire center hub region with the third diameter D3. Furthermore, the total length L2 of the elastic layer 7, including the distance L1 between both layer halves C1 and C2, is less than the total length L of the outer sleeve 6.

It is practical if the following value ranges apply to the sleeve 1 with regard to D, D1, D2, D3, L, L1, and α:

L:D=1:2 to 2:1, preferably 1.5:1

D1 or D2:D3=3:1 to 1.5:1, preferably 2.5:1 to 2:1

L:L1=3:1 to 10:1, preferably 5:1 to 10:1

α=2° to 80°, preferably 30° to 60° (reference point:longitudinal axis Y)

Figure 2:
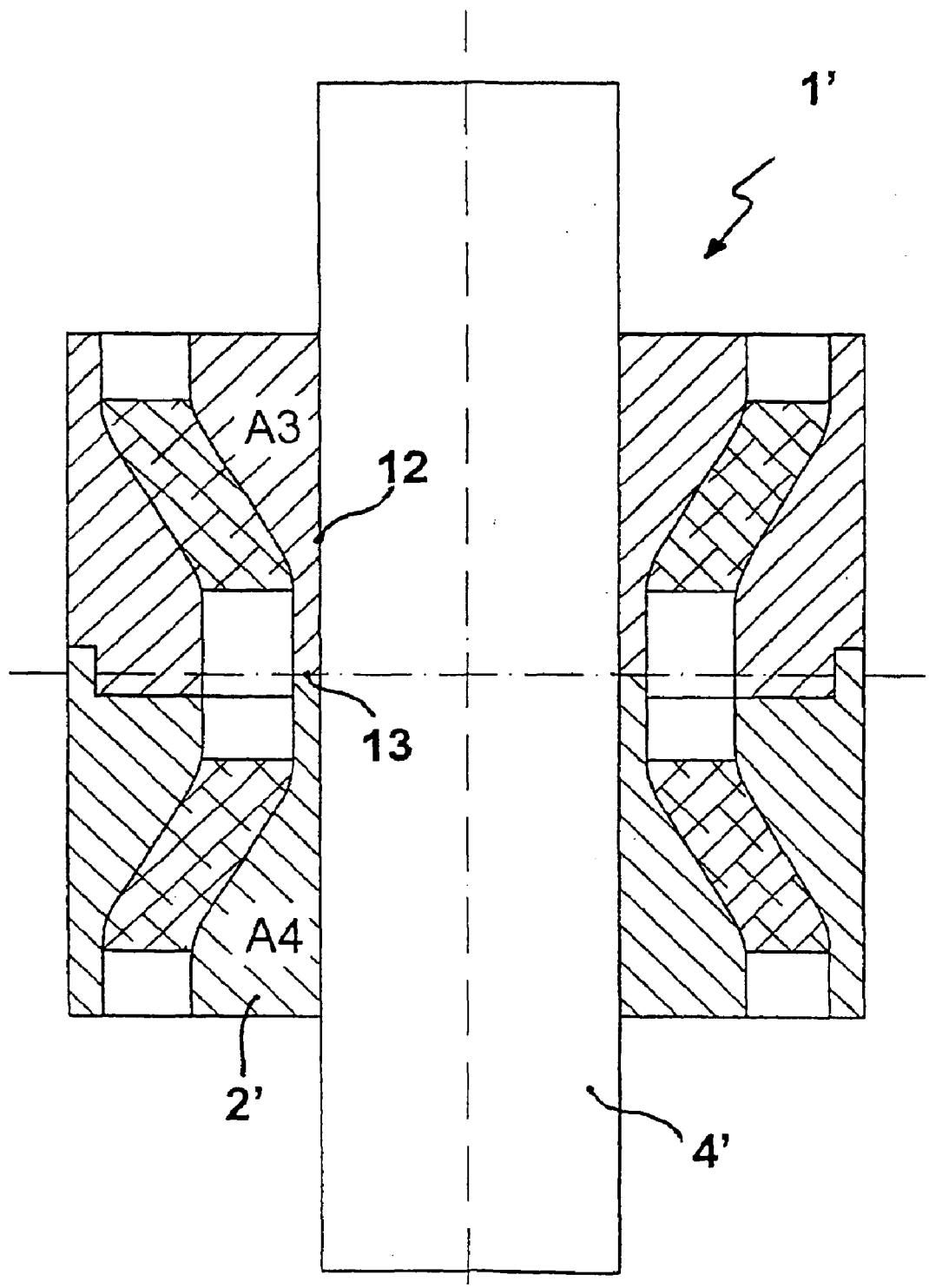
FIG. 2 a sleeve in which the core hub and the core pin are separate components, whereby both hub halves abut one another.

FIG. 2 shows a sleeve 1' in which the core hub 2' and the core pin 4' are separate components, whereby the core hub is provided in two parts, whereas the core pin extends continuously, whereby both hub halves A3 and A4 form an interference fit with the core pin within the common hub-pin contact zone 12. Furthermore, both hub halves A2 and A4 abut one another (abutment zone 13).

Figure 3:
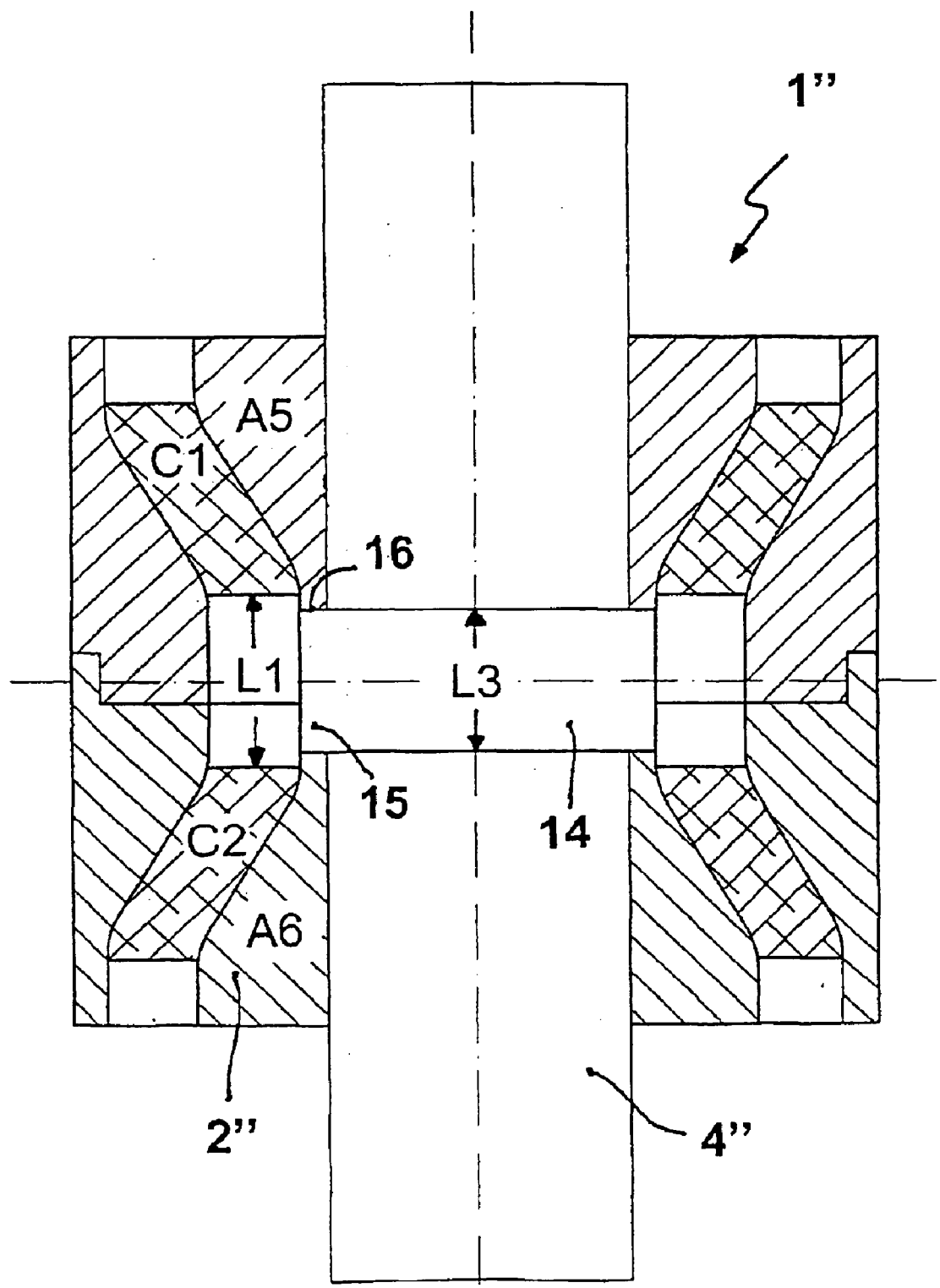
FIG. 3 a sleeve in which the core hub and the core pin are separate components, whereby both hub halves are arranged at a distance from one another.

The sleeve 1" according to FIG. 3 differs from the exemplary embodiment according to FIG. 2 merely in that both hub halves A5 and A6 of the core hub 2" are arranged at a distance L3 from one another, which is less than the distance L1 between both elastic layer halves C1 and C2. The core pin 4", which extends continuously, is thicker within its center region, whereby the projection 15 of the thickened part 14 of the pin is the stop 16 for both hub halves A5 and A6, at the same time.

As far as the other design details of the sleeves 1' and 1" are concerned, reference is made to the exemplary embodiment according to FIG. 1.

Reference Symbol List 1, 1', 1" sleeve (rod sleeve)
2, 2', 2" core hub
3 faces of the core hub
4, 4', 4" core pin
5 connecting journal
6 sleeve
7 elastic layer
8 insertion-slot system of the core
9 contact surface of the core hub to the elastic layer
10 contact surface of the outer sleeve to the elastic layer
11 insertion-slot system of the outer sleeve
12 hub-pin contact zone
13 abutment zone
14 thickened part of pin
15 projection
16 stop
A1, A2 core halves
A3, A4 hub halves
A5, A6 hub halves
B1, B2 sleeve halves
C1, C2 layer halves
D diameter of the outer sleeve
D1 first diameter
D2 second diameter
D3 third diameter
L total length of the outer sleeve
L1 distance between two layer halves
L2 total length of the elastic layer
L3 distance between two hub halves
S thickness of the elastic layer
X normal to the longitudinal axis
Y longitudinal axis
α angle in the region of the hub tapering

What is claimed is:

1. A rod sleeve for coupling a wheel set guide arm to a rail vehicle frame, the rod sleeve comprising:
    (a) a metal or plastic core having a longitudinal axis Y and a normal axis X, and formed from two core halves assembled with an interference fit by an insertion slot system, said core comprising:
        (i) a core hub having two opposite faces with respective diameters D1 and D2, and a tapered region disposed between said two opposite faces, said tapered region having an angle α with respect to said longitudinal axis Y and forming a diameter D3 at a central portion of said core hub; and
        (ii) a core pin projecting out from each of said two opposite faces along said longitudinal axis Y and forming two connecting journals;
    (b) a metal or plastic outer sleeve disposed around said core hub and formed from two sleeve halves assembled with an interference fit by an insertion slot system, said outer sleeve having a total length L along said longitudinal axis Y and an outside diameter D; and
    (c) an elastic layer disposed between said outer sleeve and said core hub and formed from two elastic layer halves spaced a distance L1 from one another, said elastic layer having a total length L2 along said longitudinal axis Y, including said distance L1, wherein said total length of said elastic layer L2 is less than said total length of said outer sleeve L;
Wherein a contact surface of said core hub and a contact surface of said outer sleeve extend in a manner essentially corresponding to said elastic layer.

2. The rod sleeve according to claim 1, wherein said elastic layer comprises an elastomer material or a thermoplastic elastomer.

3. The rod sleeve according to claim 2, wherein said elastomer material comprises natural rubber.

4. The rod sleeve according to claim 1, wherein a thickness of said elastic layer is essentially constant.

5. The rod sleeve according to claim 1, wherein a thickness of said elastic layer is 3 mm to 30 mm in an unstressed state.

6. The rod sleeve according to claim 1, wherein said angle α of the hub tapering is 20° to 80°.

7. The rod sleeve according to claim 1, wherein said distance L1 between both elastic layer halves comprises approximately an entire center hub region with the third diameter D3.

8. The rod sleeve according to claim 1, wherein a ratio of said diameter D1 or D2 to D3 comprises the following value range:

D1 or D2: D3=3:1 to 1.5:1.

9. The rod sleeve according to claim 1, wherein a ratio of said total length L of said outer sleeve to said distance L1 between both elastic layer halves comprises the following value range:

L:L1=3:1 to 10:1.

10. The rod sleeve according to claim 1, wherein a ratio of said total length L and said outside diameter D of said outer sleeve comprises the following value range:

L:D=1:2 to 2:1.

11. The rod sleeve according to claim 1, wherein a thickness of said elastic layer is 10 mm to 20 mm in an unstressed state.

12. The rod sleeve according to claim 1, wherein said angle α of the hub tapering is 30° to 60°.

13. The rod sleeve according to claim 1, wherein a ratio of said diameter D1 or D2 to D3 comprises the following value range:

D1 or D2:D3=2.5:1 to 2:1.

14. The rod sleeve according to claim 1, wherein a ratio of said total length L of said outer sleeve to said distance L1 between both elastic layer halves comprises the following value range:

L:L1=5:1 to 10:1.

15. The rod sleeve according to claim 1, wherein a ratio of said total length L and said outside diameter D of said outer sleeve comprises the following value range:

L:D=1.5:1.

* * * * *